(12) United States Patent
Lembrikov et al.

(10) Patent No.: US 7,527,721 B2
(45) Date of Patent: May 5, 2009

(54) ELECTROCHEMICAL FABRICATION METHOD FOR PRODUCING MULTI-LAYER THREE-DIMENSIONAL STRUCTURES ON A POROUS DIELECTRIC

(75) Inventors: Pavel B. Lembrikov, Santa Monica, CA (US); Dennis R. Smalley, Newhall, CA (US); Adam L. Cohen, Los Angeles, CA (US)

(73) Assignee: Microfabrica Inc., Van Nuys, CA (US)

( * ) Notice: Subject to any disclaimer, the term of this patent is extended or adjusted under 35 U.S.C. 154(b) by 951 days.

(21) Appl. No.: 10/841,378

(22) Filed: May 7, 2004

(65) Prior Publication Data
US 2005/0023146 A1 Feb. 3, 2005

Related U.S. Application Data

(60) Provisional application No. 60/533,895, filed on Dec. 31, 2003, provisional application No. 60/468,978, filed on May 7, 2003.

(51) Int. Cl.
*C25D 5/10* (2006.01)
(52) U.S. Cl. .................. 205/170; 205/220; 205/205
(58) Field of Classification Search ................ 205/118, 205/122, 170, 220
See application file for complete search history.

(56) References Cited

U.S. PATENT DOCUMENTS 5,190,637 A 3/1993 Guckel ................ 205/118
6,027,630 A 2/2000 Cohen ................ 205/135
6,514,881 B1 * 2/2003 Coffman ............... 438/780

OTHER PUBLICATIONS

Cohen, et al., "EFAB: Batch Production of Functional, Fully-Dense Metal Parts with Micron-Scale Features", Proc. 9th Solid Freeform Fabrication, The University of Texas at Austin, Aug. 1998, pp. 161.
Adam L. Cohen, et al., "EFAB: Rapid, Low-Cost Desktop Micromachining of High Aspect Ratio True 3-D MEMS", Proc. 12th IEEE Micro Electro Mechanical Systems Workshop, IEEE, Jan. 17-21, 1999, pp. 244-251.
"Microfabrication—Rapid Prototyping's Killer Application", Rapid Prototyping Report, CAD/CAM Publishing, Inc., Jun. 1999, pp. 1-5.

(Continued)

*Primary Examiner*—Nam X Nguyen
*Assistant Examiner*—Luan V Van
(74) *Attorney, Agent, or Firm*—Dennis R. Smalley

(57) ABSTRACT

Multi-layer structures are electrochemically formed on porous dielectric substrates. In some embodiments, the substrates have at least one surface which is infiltrated with a sacrificial conductive material, all pores (e.g. openings in between dielectric regions of the substrate) or selected pores near the surface of the substrate are opened, and a structural material is deposited to fill at least a portion of the opened pores. If more pores are opened than have been filled or will be filled by the structural material a sacrificial material may be deposited to fill the additional pores. After completing formation of an initial patterned surface on the substrate, a plurality of layers are formed on the substrate (e.g. via electrodeposition operations) and after layer formation is complete, the conductive sacrificial material filling the pores is removed.

22 Claims, 7 Drawing Sheets

OTHER PUBLICATIONS

Adam L. Cohen, "3-D Micromachining by Electrochemical Fabrication", Micromachine Devices, Mar. 1999, pp. 6-7.

Gang Zhang, et al., "EFAB: Rapid Desktop Manufacturing of True 3-D Microstructures", Proc. 2nd International Conference on Integrated MicroNanotechnology for Space Applications, The Aerospace Co., Apr. 1999.

F. Tseng, et al., "EFAB: High Aspect Ratio, Arbitrary 3-D Metal Microstructures Using a Low-Cost Automated Batch Process", 3rd International Workshop on High Aspect Ratio Microstructure Technology (HARMST'99), Jun. 1999.

Adam L. Cohen, et al., "EFAB: Low-Cost, Automated Electrochemical Batch Fabrication of Arbitrary 3-D Microstructures", Micromachining and Microfabrication Process Technology, SPIE 1999 Symposium on Micromachining and Microfabrication, Sep. 1999.

F. Tseng, et al., "EFAB: High Aspect Ratio, Arbitrary 3-D Metal Microstructures Using a Low-Cost Automated Batch Process", MEMS Symposium, ASME 1999 International Mechanical Engineering Congress and Exposition, Nov. 1999.

Adam L. Cohen, "Electrochemical Fabrication (EFABTM)", Chapter 19 of the MEMS Handbook, edited by Mohamed Gad-El-Hak, CRC Press, 2002, pp. 19/1-19/23.

* cited by examiner

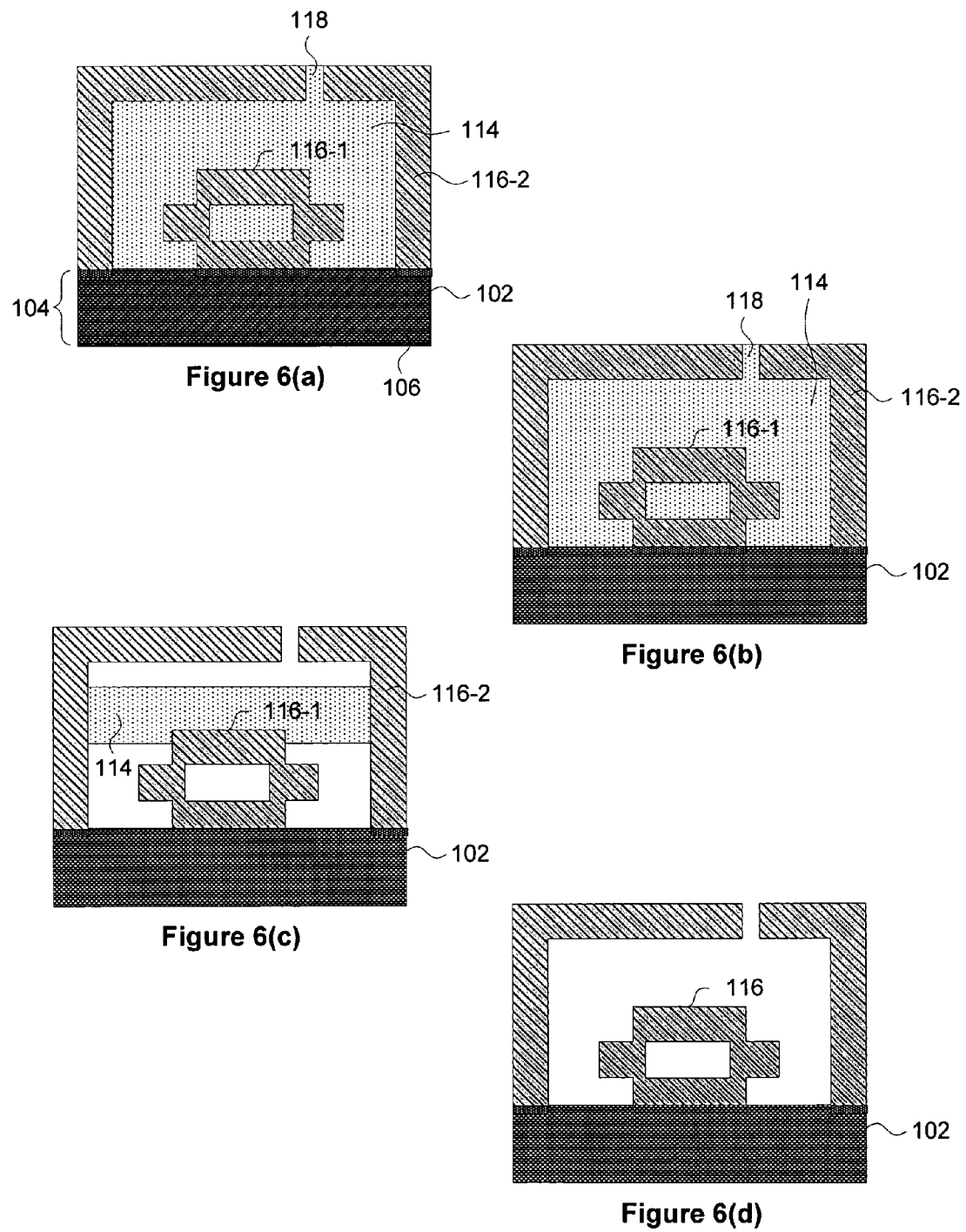

US 7,527,721 B2

ELECTROCHEMICAL FABRICATION METHOD FOR PRODUCING MULTI-LAYER THREE-DIMENSIONAL STRUCTURES ON A POROUS DIELECTRIC

RELATED APPLICATIONS

This Application claims benefit to U.S. Provisional Patent Application Nos. 60/468,978 and 60/533,895 filed on May 7, 2003 and Dec. 31, 2003, respectively. These referenced applications are hereby incorporated herein by reference as if set forth in full herein

FIELD OF THE INVENTION

The embodiments of various aspects of the invention relate generally to the formation of three-dimensional structures using electrochemical fabrication methods via a layer-by-layer build up of deposited materials on a substrate wherein the multi-layer structures are formed on porous, dielectric substrates.

BACKGROUND

A technique for forming three-dimensional structures (e.g. parts, components, devices, and the like) from a plurality of adhered layers was invented by Adam L. Cohen and is known as Electrochemical Fabrication. It is being commercially pursued by Microfabrica™ Inc. (formerly MEMGen® Corporation) of Burbank, Calif. under the name EFAB®. This technique was described in U.S. Pat. No. 6,027,630, issued on Feb. 22, 2000. This electrochemical deposition technique allows the selective deposition of a material using a unique masking technique that involves the use of a mask that includes patterned conformable material on a support structure that is independent of the substrate onto which plating will occur. When desiring to perform an electrodeposition using the mask, the conformable portion of the mask is brought into contact with a substrate while in the presence of a plating solution such that the contact of the conformable portion of the mask to the substrate inhibits deposition at selected locations. For convenience, these masks might be generically called conformable contact masks; the masking technique may be generically called a conformable contact mask plating process. More specifically, in the terminology of Microfabrica™ Inc. (formerly MEMGen® Corporation) of Burbank, Calif. such masks have come to be known as INSTANT MASKS™ and the process known as INSTANT MASKING or INSTANT MASK™ plating. Selective depositions using conformable contact mask plating may be used to form single layers of material or may be used to form multi-layer structures. The teachings of the '630 patent are hereby incorporated herein by reference as if set forth in full herein. Since the filing of the patent application that led to the above noted patent, various papers about conformable contact mask plating (i.e. INSTANT MASKING) and electrochemical fabrication have been published:

(1) A. Cohen, G. Zhang, F. Tseng, F. Mansfeld, U. Frodis and P. Will, "EFAB: Batch production of functional, fully-dense metal parts with micro-scale features", Proc. 9th Solid Freeform Fabrication, The University of Texas at Austin, p161, August 1998.

(2) A. Cohen, G. Zhang, F. Tseng, F. Mansfeld, U. Frodis and P. Will, "EFAB: Rapid, Low-Cost Desktop Micromachining of High Aspect Ratio True 3-D MEMS", Proc. 12th IEEE Micro Electro Mechanical Systems Workshop, IEEE, p244, January 1999.

(3) A. Cohen, "3-D Micromachining by Electrochemical Fabrication", Micromachine Devices, March 1999.

(4) G. Zhang, A. Cohen, U. Frodis, F. Tseng, F. Mansfeld, and P. Will, "EFAB: Rapid Desktop Manufacturing of True 3-D Microstructures", Proc. 2nd International Conference on Integrated MicroNanotechnology for Space Applications, The Aerospace Co., April 1999.

(5) F. Tseng, U. Frodis, G. Zhang, A. Cohen, F. Mansfeld, and P. Will, "EFAB: High Aspect Ratio, Arbitrary 3-D Metal Microstructures using a Low-Cost Automated Batch Process", 3rd International Workshop on High Aspect Ratio MicroStructure Technology (HARMST'99), June 1999.

(6) A. Cohen, U. Frodis, F. Tseng, G. Zhang, F. Mansfeld, and P. Will, "EFAB: Low-Cost, Automated Electrochemical Batch Fabrication of Arbitrary 3-D Microstructures", Micromachining and Microfabrication Process Technology, SPIE 1999 Symposium on Micromachining and Microfabrication, September 1999.

(7) F. Tseng, G. Zhang, U. Frodis, A. Cohen, F. Mansfeld, and P. Will, "EFAB: High Aspect Ratio, Arbitrary 3-D Metal Microstructures using a Low-Cost Automated Batch Process", MEMS Symposium, ASME 1999 International Mechanical Engineering Congress and Exposition, November, 1999.

(8) A. Cohen, "Electrochemical Fabrication (EFABTM)", Chapter 19 of The MEMS Handbook, edited by Mohamed Gad-El-Hak, CRC Press, 2002.

(9) "Microfabrication—Rapid Prototyping's Killer Application", pages 1-5 of the Rapid Prototyping Report, CAD/CAM Publishing, Inc., June 1999.

The disclosures of these nine publications are hereby incorporated herein by reference as if set forth in full herein.

The electrochemical deposition process may be carried out in a number of different ways as set forth in the above patent and publications. In one form, this process involves the execution of three separate operations during the formation of each layer of the structure that is to be formed:

1. Selectively depositing at least one material by electrodeposition upon one or more desired regions of a substrate.

2. Then, blanket depositing at least one additional material by electrodeposition so that the additional deposit covers both the regions that were previously selectively deposited onto, and the regions of the substrate that did not receive any previously applied selective depositions.

3. Finally, planarizing the materials deposited during the first and second operations to produce a smoothed surface of a first layer of desired thickness having at least one region containing the at least one material and at least one region containing at least the one additional material.

After formation of the first layer, one or more additional layers may be formed adjacent to the immediately preceding layer and adhered to the smoothed surface of that preceding layer. These additional layers are formed by repeating the first through third operations one or more times wherein the formation of each subsequent layer treats the previously formed layers and the initial substrate as a new and thickening substrate.

Once the formation of all layers has been completed, at least a portion of at least one of the materials deposited is generally removed by an etching process to expose or release the three-dimensional structure that was intended to be formed.

The preferred method of performing the selective electrodeposition involved in the first operation is by conformable contact mask plating. In this type of plating, one or more conformable contact (CC) masks are first formed. The CC masks include a support structure onto which a patterned conformable dielectric material is adhered or formed. The conformable material for each mask is shaped in accordance with a particular cross-section of material to be plated. At least one CC mask is needed for each unique cross-sectional pattern that is to be plated.

The support for a CC mask is typically a plate-like structure formed of a metal that is to be selectively electroplated and from which material to be plated will be dissolved. In this typical approach, the support will act as an anode in an electroplating process. In an alternative approach, the support may instead be a porous or otherwise perforated material through which deposition material will pass during an electroplating operation on its way from a distal anode to a deposition surface. In either approach, it is possible for CC masks to share a common support, i.e. the patterns of conformable dielectric material for plating multiple layers of material may be located in different areas of a single support structure. When a single support structure contains multiple plating patterns, the entire structure is referred to as the CC mask while the individual plating masks may be referred to as "submasks". In the present application such a distinction will be made only when relevant to a specific point being made.

In preparation for performing the selective deposition of the first operation, the conformable portion of the CC mask is placed in registration with and pressed against a selected portion of the substrate (or onto a previously formed layer or onto a previously deposited portion of a layer) on which deposition is to occur. The pressing together of the CC mask and substrate occur in such a way that all openings, in the conformable portions of the CC mask contain plating solution. The conformable material of the CC mask that contacts the substrate acts as a barrier to electrodeposition while the openings in the CC mask that are filled with electroplating solution act as pathways for transferring material from an anode (e.g. the CC mask support) to the non-contacted portions of the substrate (which act as a cathode during the plating operation) when an appropriate potential and/or current are supplied.

An example of a CC mask and CC mask plating are shown in FIGS. 1(a)-1(c). FIG. 1(a) shows a side view of a CC mask 8 consisting of a conformable or deformable (e.g. elastomeric) insulator 10 patterned on an anode 12. The anode has two functions. FIG. 1(a) also depicts a substrate 6 separated from mask 8. One is as a supporting material for the patterned insulator 10 to maintain its integrity and alignment since the pattern may be topologically complex (e.g., involving isolated "islands" of insulator material). The other function is as an anode for the electroplating operation. CC mask plating selectively deposits material 22 onto a substrate 6 by simply pressing the insulator against the substrate then electrodepositing material through apertures 26a and 26b in the insulator as shown in FIG. 1(b). After deposition, the CC mask is separated, preferably non-destructively, from the substrate 6 as shown in FIG. 1(c). The CC mask plating process is distinct from a "through-mask" plating process in that in a through-mask plating process the separation of the masking material from the substrate would occur destructively. As with through-mask plating, CC mask plating deposits material selectively and simultaneously over the entire layer. The plated region may consist of one or more isolated plating regions where these isolated plating regions may belong to a single structure that is being formed or may belong to multiple structures that are being formed simultaneously. In CC mask plating as individual masks are not intentionally destroyed in the removal process, they may be usable in multiple plating operations.

Another example of a CC mask and CC mask plating is shown in FIGS. 1(dg)-1(f). FIG. 1(d) shows an anode 12' separated from a mask 8' that includes a patterned conformable material 10' and a support structure 20. FIG. 1(d) also depicts substrate 6 separated from the mask 8'. FIG. 1(e) illustrates the mask 8' being brought into contact with the substrate 6. FIG. 1(f) illustrates the deposit 22' that results from conducting a current from the anode 12' to the substrate 6. FIG. 1(g) illustrates the deposit 22' on substrate 6 after separation from mask 8'. In this example, an appropriate electrolyte is located between the substrate 6 and the anode 12' and a current of ions coming from one or both of the solution and the anode are conducted through the opening in the mask to the substrate where material is deposited. This type of mask may be referred to as an anodeless INSTANT MASK™ (AIM) or as an anodeless conformable contact (ACC) mask.

Unlike through-mask plating, CC mask plating allows CC masks to be formed completely separate from the fabrication of the substrate on which plating is to occur (e.g. separate from a three-dimensional (3D) structure that is being formed). CC masks may be formed in a variety of ways, for example, a photolithographic process may be used. All masks can be generated simultaneously, prior to structure fabrication rather than during it. This separation makes possible a simple, low-cost, automated, self-contained, and internally-clean "desktop factory" that can be installed almost anywhere to fabricate 3D structures, leaving any required clean room processes, such as photolithography to be performed by service bureaus or the like.

An example of the electrochemical fabrication process discussed above is illustrated in FIGS. 2(a)-2(f). These figures show that the process involves deposition of a first material 2 which is a sacrificial material and a second material 4 which is a structural material. The CC mask 8, in this example, includes a patterned conformable material (e.g. an elastomeric dielectric material) 10 and a support 12 which is made from deposition material 2. The conformal portion of the CC mask is pressed against substrate 6 with a plating solution 14 located within the openings 16 in the conformable material 10. An electric current, from power supply 18, is then passed through the plating solution 14 via (a) support 12 which doubles as an anode and (b) substrate 6 which doubles as a cathode. FIG. 2(a), illustrates that the passing of current causes material 2 within the plating solution and material 2 from the anode 12 to be selectively transferred to and plated on the cathode 6. After electroplating the first deposition material 2 onto the substrate 6 using CC mask 8, the CC mask 8 is removed as shown in FIG. 2(b). FIG. 2(c) depicts the second deposition material 4 as having been blanket-deposited (i.e. non-selectively deposited) over the previously deposited first deposition material 2 as well as over the other portions of the substrate 6. The blanket deposition occurs by electroplating from an anode (not shown), composed of the second material, through an appropriate plating solution (not shown), and to the cathode/substrate 6. The entire two-material layer is then planarized to achieve precise thickness and flatness as shown in FIG. 2(d). After repetition of this process for all layers, the multi-layer structure 20 formed of the second material 4 (i.e. structural material) is embedded in first material 2 (i.e. sacrificial material) as shown in FIG. 2(e). The embedded structure is etched to yield the desired device, i.e. structure 20, as shown in FIG. 2(f).

Various components of an exemplary manual electrochemical fabrication system 32 are shown in FIGS. 3(a)-3(c). The system 32 consists of several subsystems 34, 36, 38, and 40. The substrate holding subsystem 34 is depicted in the upper portions of each of FIGS. 3(a) to 3(c) and includes several components: (1) a carrier 48, (2) a metal substrate 6 onto which the layers are deposited, and (3) a linear slide 42 capable of moving the substrate 6 up and down relative to the carrier 48 in response to drive force from actuator 44. Subsystem 34 also includes an indicator 46 for measuring differences in vertical position of the substrate which may be used in setting or determining layer thicknesses and/or deposition thicknesses. The subsystem 34 further includes feet 68 for carrier 48 which can be precisely mounted on subsystem 36.

The CC mask subsystem 36 shown in the lower portion of FIG. 3(a) includes several components: (1) a CC mask 8 that is actually made up of a number of CC masks (i.e. submasks) that share a common support/anode 12, (2) precision X-stage 54, (3) precision Y-stage 56, (4) frame 72 on which the feet 68 of subsystem 34 can mount, and (5) a tank 58 for containing the electrolyte 16. Subsystems 34 and 36 also include appropriate electrical connections (not shown) for connecting to an appropriate power source for driving the CC masking process.

The blanket deposition subsystem 38 is shown in the lower portion of FIG. 3(b) and includes several components: (1) an anode 62, (2) an electrolyte tank 64 for holding plating solution 66, and (3) frame 74 on which the feet 68 of subsystem 34 may sit. Subsystem 38 also includes appropriate electrical connections (not shown) for connecting the anode to an appropriate power supply for driving the blanket deposition process.

The planarization subsystem 40 is shown in the lower portion of FIG. 3(c) and includes a lapping plate 52 and associated motion and control systems (not shown) for planarizing the depositions.

The '630 patent describes a number of techniques for forming electroplating articles (i.e. contact masks) where the supporting structure is a porous material but doesn't address the formation of multi-layers structures on porous substrates.

In addition to teaching the use of CC masks for electrodeposition purposes, the '630 patent also teaches that the CC masks may be placed against a substrate with the polarity of the voltage reversed and material may thereby be selectively removed from the substrate. It indicates that such removal processes can be used to selectively etch, engrave, and polish a substrate, e.g., a plaque.

The '630 patent further indicates that the electroplating methods and articles disclosed therein allow fabrication of devices from thin layers of materials such as, e.g., metals, polymers, ceramics, and semiconductor materials. It further indicates that although the electroplating embodiments described therein have been described with respect to the use of two metals, a variety of materials, e.g., polymers, ceramics and semiconductor materials, and any number of metals can be deposited either by the electroplating methods therein, or in separate processes that occur throughout the electroplating method. It indicates that a thin plating base can be deposited, e.g., by sputtering, over a deposit that is insufficiently conductive (e.g., an insulating layer) so as to enable subsequent electroplating. It also indicates that multiple support materials (i.e. sacrificial materials) can be included in the electroplated element allowing selective removal of the support materials.

Another method for forming microstructures from electroplated metals (i.e. using electrochemical fabrication techniques) is taught in U.S. Pat. No. 5,190,637 to Henry Guckel, entitled "Formation of Microstructures by Multiple Level Deep X-ray Lithography with Sacrificial Metal layers". This patent teaches the formation of metal structure utilizing mask exposures. A first layer of a primary metal is electroplated onto an exposed plating base to fill a void in a photoresist, the photoresist is then removed and a secondary metal is electroplated over the first layer and over the plating base. The exposed surface of the secondary metal is then machined down to a height which exposes the first metal to produce a flat uniform surface extending across the both the primary and secondary metals. Formation of a second layer may then begin by applying a photoresist layer over the first layer and then repeating the process used to produce the first layer. The process is then repeated until the entire structure is formed and the secondary metal is removed by etching. The photoresist is formed over the plating base or previous layer by casting and the voids in the photoresist are formed by exposure of the photoresist through a patterned mask via X-rays or UV radiation.

SUMMARY OF THE DISCLOSURE

It is an object of some aspects of the invention to provide an electrochemical fabrication process with enhanced capabilities.

It is an object of some aspects of the invention to provide a fabrication process that provides multi-layer structures on porous substrates.

Other objects and advantages of various aspects of the invention will be apparent to those of skill in the art upon review of the teachings herein. The various aspects of the invention, set forth explicitly herein or otherwise ascertained from the teachings herein, may address one or more of the objects set forth above or may address some other object or objects that may be ascertainable from the teachings herein. It is not intended that all objects set forth above be addressed by any single aspect of the invention even though that may be the case with regard to some aspects.

In a first aspect of the invention a fabrication process for forming a multi-layer three-dimensional structure, includes: (a) supplying a substrate which includes a porous dielectric having connected regions of dielectric material with spaces located between the regions and having a first sacrificial material located within at least some of the spaces; (b) forming a pattern of at least one structural material which contacts the dielectric regions and occupies at least a portion of the openings between some of the dielectric regions; (c) forming a plurality of layers of patterned material on the substrate, wherein each layer includes at least one structural material; and (d) after formation of the plurality of layers, removing at least part of the first sacrificial material from the spaces.

In a second aspect of the invention a fabrication process for forming a multi-layer three-dimensional structure, includes: (a) supplying a substrate which includes a porous dielectric having connected regions of dielectric material with spaces located between the regions; (b) depositing a pattern of at least one structural material which contacts the dielectric regions and occupies at least a portion of the openings between some of the dielectric regions; and (c) forming a plurality of layers of patterned material on the substrate, wherein each layer includes at least one structural material.

Further aspects of the invention will be understood by those of skill in the art upon reviewing the teachings herein. Other aspects of the invention may involve combinations of the above noted aspects of the invention and/or addition of various features of one or more embodiments. Other aspects of the invention may involve apparatus that are configured to implement one or more of the above method aspects of the invention. These other aspects of the invention may provide various combinations of the aspects presented above as well as provide other configurations, structures, functional relationships, and processes that have not been specifically set forth above.

BRIEF DESCRIPTION OF THE DRAWINGS

FIGS. 6(a)-6(d) schematically depict side views of various states of the process of an embodiment of an aspect of the invention where removal of the sacrificial material used in forming a multi-layer structure occurs at least in part via the pores of a porous substrate.

DETAILED DESCRIPTION OF PREFERRED EMBODIMENTS OF THE INVENTION

FIGS. 1(a)-1(g), 2(a)-2(f), and 3(a)-3(c) illustrate various features of one form of electrochemical fabrication that are known. Other electrochemical fabrication techniques are set forth in the '630 patent referenced above, in the various previously incorporated publications, in various other patents and patent applications incorporated herein by reference, still others may be derived from combinations of various approaches described in these publications, patents, and applications, or are otherwise known or ascertainable by those of skill in the art from the teachings set forth herein. All of these techniques may be combined with those of the various embodiments of various aspects of the invention explicitly set forth herein to yield enhanced embodiments. Still other embodiments may be derived from combinations of the various embodiments explicitly set forth herein.

Figure 1A:
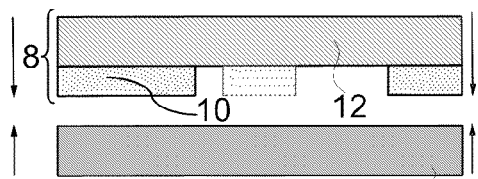
FIGS. 1(a)-1(c) schematically depict side views of various stages of a CC mask plating process, while FIGS. 1(d)-(g) schematically depict a side views of various stages of a CC mask plating process using a different type of CC mask.
Figure 1B:
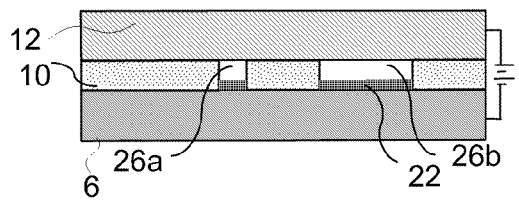
Figure 1C:
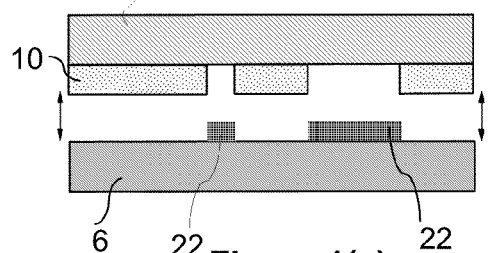
Figure 1D:
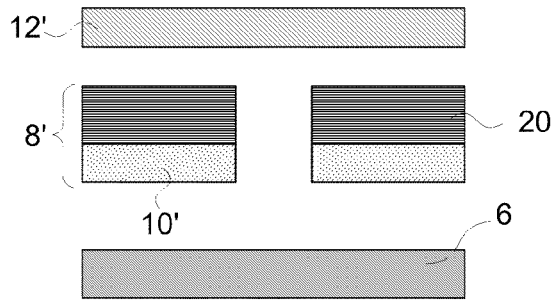
Figure 1E:
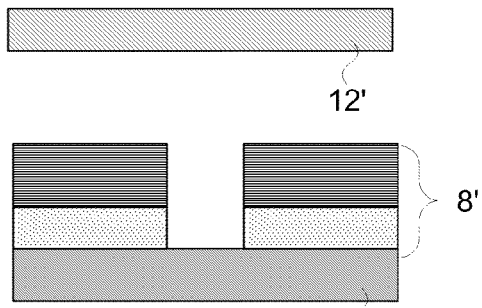
Figure 1F:
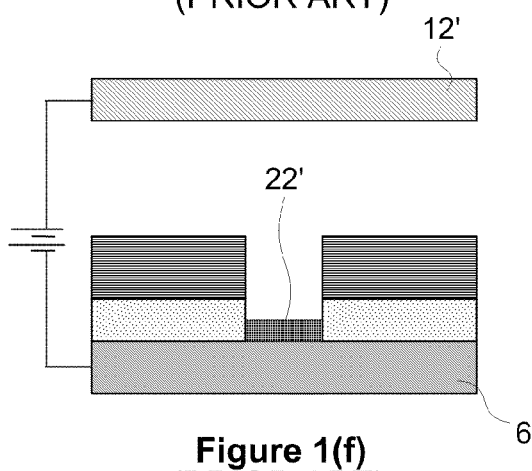
Figure 1G:
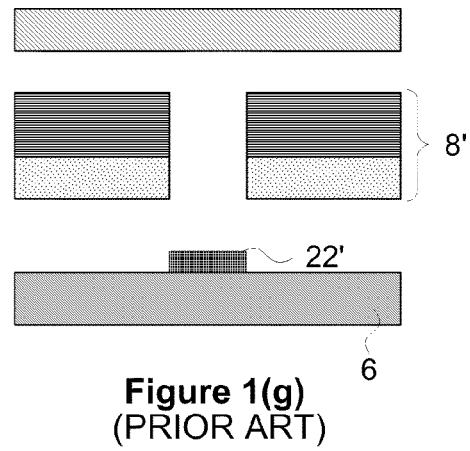
Figure 2A:
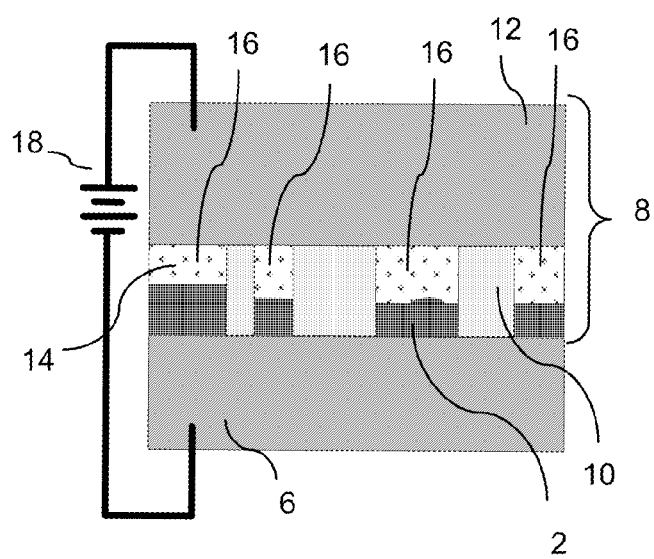
FIGS. 2(a)-2(f) schematically depict side views of various stages of an electrochemical fabrication process as applied to the formation of a particular structure where a sacrificial material is selectively deposited while a structural material is blanket deposited.
Figure 2B:
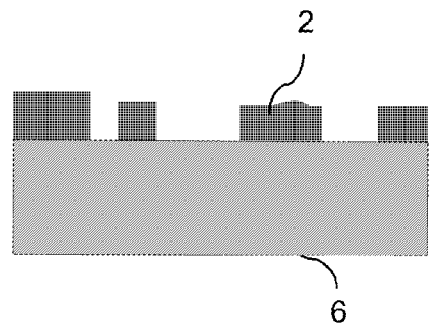
Figure 2C:
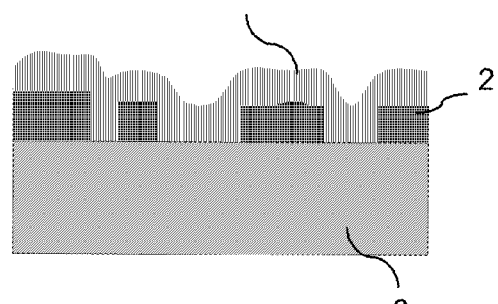
Figure 2D:
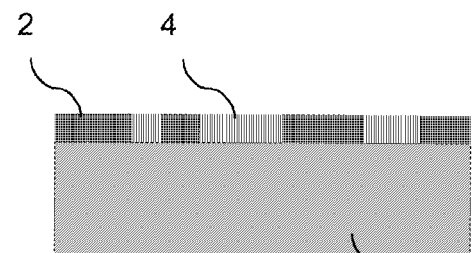
Figure 2E:
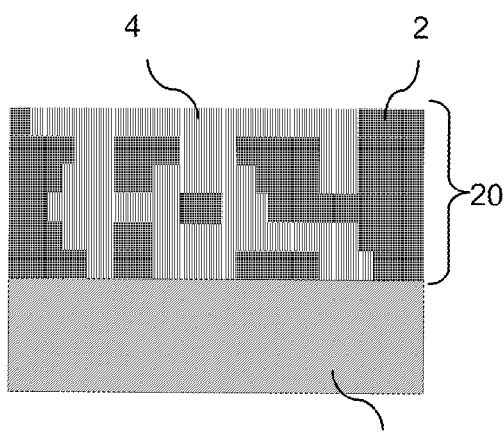
Figure 2F:
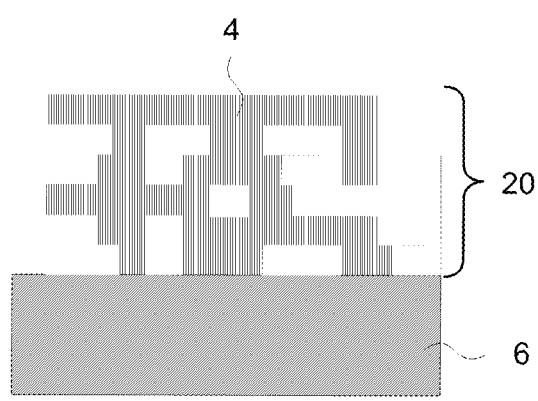
Figure 3A:
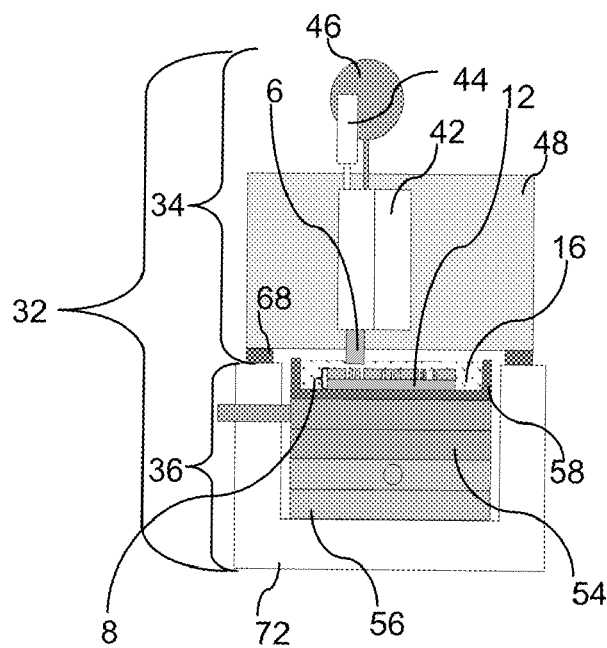
FIGS. 3(a)-3(c) schematically depict side views of various example subassemblies that may be used in manually implementing the electrochemical fabrication method depicted in FIGS. 2(a)-2(f).
Figure 3B:
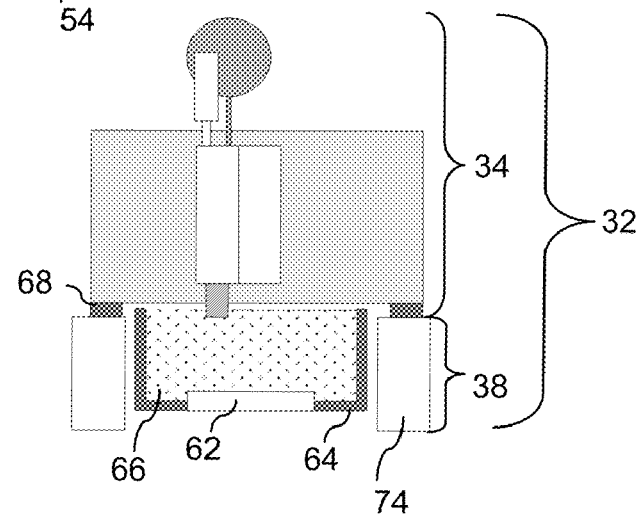
Figure 3C:
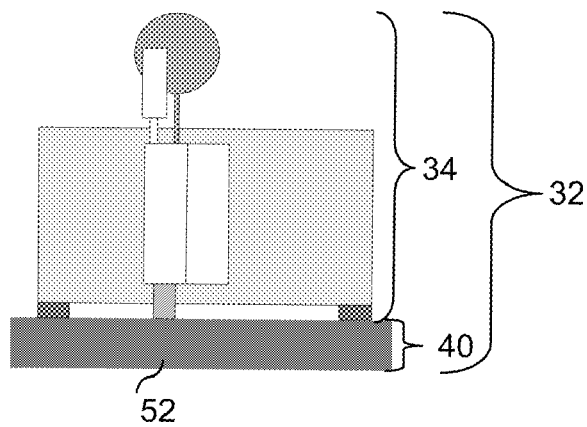
Figure 4A:
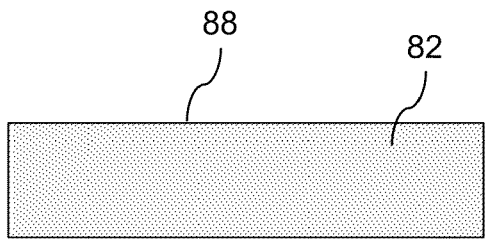
FIGS. 4(a)-4(i) schematically depict the formation of a first layer of a structure using adhered mask plating where the blanket deposition of a second material overlays both the openings between deposition locations of a first material and the first material itself.
Figure 4B:
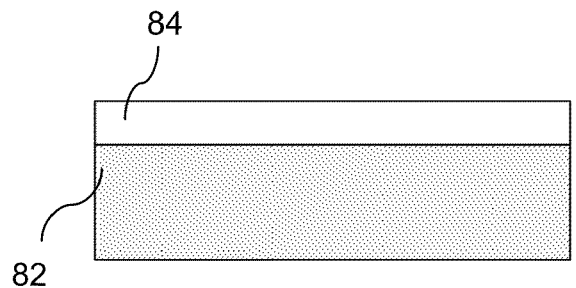
Figure 4C:
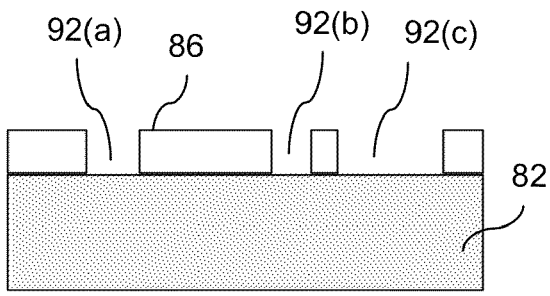
Figure 4D:
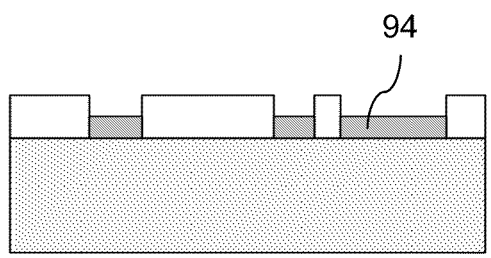
Figure 4E:
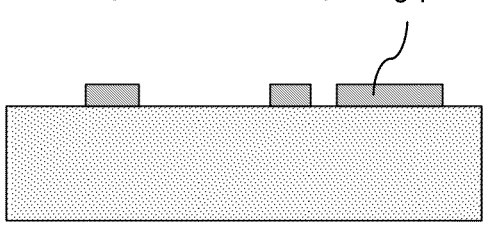
Figure 4F:
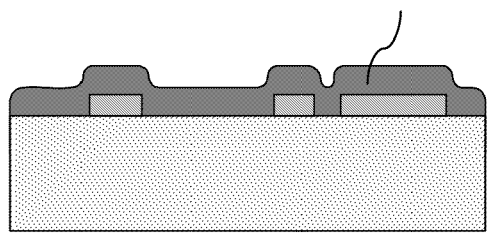
Figure 4G:
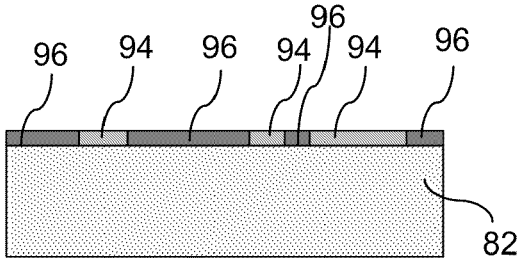
Figure 4H:
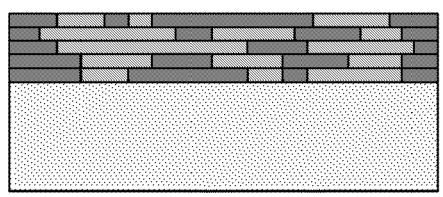
Figure 4I:
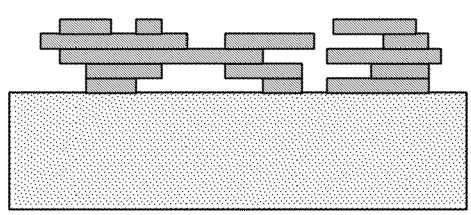

FIGS. 4(a)-4(i) illustrate various stages in the formation of a single layer of a multi-layer fabrication process where a second metal is deposited on a first metal as well as in openings in the first metal where its deposition forms part of the layer. In FIG. 4(a), a side view of a substrate 82 is shown, onto which patternable photoresist 84 is cast as shown in FIG. 4(b). In FIG. 4(c), a pattern of resist is shown that results from the curing, exposing, and developing of the resist. The patterning of the photoresist 84 results in openings or apertures 92(a)-92(c) extending from a surface 86 of the photoresist through the thickness of the photoresist to surface 88 of the substrate 82. In FIG. 4(d), a metal 94 (e.g. nickel) is shown as having been electroplated into the openings 92(a)-92(c). In FIG. 4(e), the photoresist has been removed (i.e. chemically stripped) from the substrate to expose regions of the substrate 82 which are not covered with the first metal 94. In FIG. 4(f), a second metal 96 (e.g., silver) is shown as having been blanket electroplated over the entire exposed portions of the substrate 82 (which is conductive) and over the first metal 94 (which is also conductive). FIG. 4(g) depicts the completed first layer of the structure which has resulted from the planarization of the first and second metals down to a height that exposes the first metal and sets a thickness for the first layer. In FIG. 4(h) the result of repeating the process steps shown in FIGS. 4(b)-4(g) several times to form a multi-layer structure are shown where each layer consists of two materials. For most applications, one of these materials is removed as shown in FIG. 4(i) to yield a desired 3-D structure 98 (e.g. component or device).

Various embodiments of various aspects of the invention are directed to formation of three-dimensional structures from materials some of which are to be electrodeposited. Some of these structures may be formed form a single layer of one or more deposited materials while others are formed from a plurality of layers of deposited materials (e.g. 2 or more layers, more preferably five or more layers, and most preferably ten or more layers). In some embodiments structures having features positioned with micron level precision and minimum features size on the order of tens of microns are to be formed. In other embodiments structures with less precise feature placement and/or larger minimum features may be formed. In still other embodiments, higher precision and smaller minimum feature sizes may be desirable.

Various embodiments to be discussed herein after may be focused primarily on a particular type of masking technique for selective patterning of deposited materials. However, each embodiment may have alternatives that are implementable with other patterning techniques. For example, some embodiments may have alternatives that may use contact masks and contact masking operations, such as conformable contact masks as described above, or non-conformable masks and masking operations (i.e. masks and operations based on masks whose contact surfaces are not significantly conformable). Other alternatives may make use of proximity masks and masking operations (i.e. operations that use masks that at least partially selectively shield a substrate by their proximity to the substrate even if contact is not made). Still other alternatives may make use of various types of adhered masks and masking operations (masks and operations that use masks that are adhered to a substrate onto which selective deposition or etching is to occur as opposed to only being contacted to it). Adhered masks may be formed in a number of ways including, for example (1) by application of a photoresist, selective exposure of the photoresist, and then development of the photoresist, (2) selective transfer of pre-patterned masking material, and/or (3) direct formation of masks from computer controlled depositions of material. Selective patterning using masks may occur by depositing a selected material into voids or openings in the masks or it occur by selectively etching a surface of an already deposited material using the mask. In other applications, selective patterning may not involve a significant height of deposition of material or significant depth of etching of material but instead may involve treating a surface in a selective manner, e.g. selective microetching of a surface (e.g. to improve adhesion between it and a material), selective oxidization of a surface (e.g. to change its conductivity), selective chemical treatment of a surface (e.g. in preparation for an electroless deposition), and the like.

A first embodiment starts forming a multi-layer structure on a porous ceramic substrate. This substrate is a dielectric. The first operation in the process is to fill the pores of the ceramic with a sacrificial material, such as copper, silver, zinc, or the like. This may be done in a variety of various. For example, the substrate may be placed in an oven with a block of the sacrificial material (e.g. infiltrant), the substrate and infiltrant may be heated such that the infiltrant wicks up into the voids of the ceramic. Alternatively, for example, the ceramic may be dipped into a bath of the infiltrant. In some alternative embodiments, the filling of the pores in the ceramic may occur by placing a cathode against or near a surface of the substrate and then immersing the substrate in an electroplating bath using electroplating to draw sacrificial material into the substrate and to deposit such material to fill the pores. The electrode placed at or near a surface of the substrate may include sidewalls that are insulative or conductive such that they may contribute to the deposition or limit the deposition of material. This filling operation makes the substrate conductive and thus capable of receiving material by electrodeposition. This filling may fill all pores or only those pores near a surface on which a first layer of building material will be formed.

The second operation of this first embodiment planarizes the face of the filled substrate in preparation for adding layers of a deposited material. The planarization may occur by lapping and preferably though not necessarily exposes a surface of the ceramic. This operation may set the surface of the substrate to not only to a desired level but also to a particular orientation. This surface may acts as the substrate on which the layers of material will be added. This operation sets the stage for ensuring that adequate bonding of the layers of deposited material can be achieved across as much of the surface cross-sectional structure as desired.

The third operation of this first embodiment etches away a thin layer of sacrificial material from the planed face of the substrate. This etching operation exposes a thin layer of the ceramic including some pores that form undercuts below portions of the ceramic structure. This thin layer of ceramic acts as a base onto which structural material can be bonded. In this embodiment, the etching operation is of the selective type. This etching operation may be performed, for example, chemically or electrochemically. In this embodiment selective etching is preferred, for example using a contact mask or adhered mask. This selective etching is preferred in that it may minimize the risk of undesired spreading of plated material during the subsequent selective plating (of the fourth operation to be discussed hereafter) which might otherwise result from subsurface flow paths in the substrate allowing deposited material to spread outside a region that is intended for deposition. Selective etching may take on a variety of patterns. These patterns may relate to the shape of the structural material which will be located on the first layer. For example, the etching may take the form of the first cross-section of structural material to be plated or it may take the form of an interior portion of that cross-section (e.g. an eroded portion of the first cross-section or a plurality of bonding locations within a pattern of the first cross-section. Alternatively the etching pattern may take a form which is independent of the configuration of the first cross-section (e.g. a pattern of potential attachment locations which will or will not act as bonding sites depending on relationship between their locations and the positioning and shape of the first cross-section) but which are separate from one another and will result in electric isolation of independent structures when building is complete.

The fourth operation of this embodiment deposits structural material (e.g. nickel, tin, gold, copper, and the like) in a blanket fashion across the exposed surface of the substrate. This deposition plates structural material into the exposed pores (i.e. voids) that resulted from the etching operation as well as to all other locations on the surface of the substrate.

The fifth operation planarizes the deposited structural material down to a level that leaves structural material only within the bounds of the area etched in third operation. After the fifth operation the substrate includes a planed surface that includes a structural material bonded directly to the ceramic in selected locations and a sacrificial conductive material located elsewhere. The substrate is now in condition for receiving a plurality of layers of deposited material. In the present embodiment, these layers will consist of two materials, a structural material which is the same as the structural material that is already bonded to the substrate and a sacrificial material that is the same as the sacrificial material that was used to fill the pores of the ceramic substrate.

The sixth operation of this first embodiment includes selectively depositing a sacrificial material to desired locations on the planed substrate (e.g. by electrodeposition) to a height which is equal to or greater than the desired layer thickness. This selective deposition may occur, for example, via use of a contact mask or an adhered mask.

The seventh operation of this first embodiment includes blanket depositing structural material into voids in the sacrificial material that was deposited by the sixth operation as well as over the sacrificial material. The structural material is preferably deposited to a height which is equal to or greater than the desired layer thickness.

The eighth operation of this first embodiment planarizes the deposited layer to the desired height for that layer so that the layer becomes bounded. The layer formed by the sixth through eighth operations may correspond to the first or second layer of the structure depending on whether the previous operations resulted in creation of the first layer.

Next, the sixth-eighth operations are repeated one or more times to build up the desired structure from a plurality of adhered layers.

After layer formation is complete the combined substrate and deposited material is subjected to a sacrificial material etchant and etching operations that results in the removal of the sacrificial material from the layers of the deposited material and the removal of the sacrificial material from the pores of the ceramic. This etching operation results in a desired structure attached to a dielectric substrate.

If desired, additional operations may be performed. For example, such operations may include filling of the pores of the substrate with a non-conductive material and then solidifying it, heat treating the formed structure, testing the functionality of the structure, and the like.

Many alternatives to this first embodiment are possible. For example in some alternative embodiments, the porous substrate may not be a ceramic but instead may be a polymer material, a composite material, or other non-conductive material. The substrate may have a porous portion on which layer formation will occur and other portions which are non-porous. The substrate may contain conductive paths and/or flow paths with solid walls that may be used to connect the formed structure to other components or to different portions of the structure itself.

In still other embodiments, the sacrificial material used to fill the pores may be different from the sacrificial material used in forming the structure. The structural material used in causing adhesion to the substrate may be different from the structural material used in forming the structure. In even further embodiments, multiple sacrificial materials and/or structural materials may be used in forming the structure itself or in filling the pores in the substrate in establishing adhesion between the substrate and the structure.

In still other alternative embodiments, when the sacrificial material used to form layers is different from that used to fill the pores of the substrate, additional etching operations and the like may be used to create enhanced bonding between the layer forming sacrificial material and the substrate.

In other embodiments, the blanket depositions of the structural material may be replaced by selective depositions using contact masks or adhered masks. In particular, for example, the masked used for selective etching into the substrate may be remain in place and be used for selectively depositing a first layer of structural material, and thereafter it may be removed and sacrificial material blanket deposited, and then planarization allowed to occur where the planarization level may be chosen such that remaining structural material extends above the height at which etching of third operation was initiated. In still other embodiments. In still other embodiments, both sacrificial material and structural material may be blanket deposited.

In still other alternative embodiments, if the planarization of the filled substrate exposes a sufficient portion of the substrate matrix (i.e. elements of the substrate that surround pores of the unfilled substrate), it may be possible to skip the initial etching operations as the structural material may be applied directly to the exposed surfaces of the matrix elements and bond sufficiently to them.

In a second embodiment, the blanket deposition of structural material of the fourth operation of the first embodiment is replaced by a selective deposition of sacrificial material to non-structural material regions of the first cross-section. The height of deposition is sufficient to reach or exceed the intended height of the first layer. Additionally, the fifth through eighth operations are replaced by a blanket deposition of structural material which fills the voids in the pores of the substrate and extends to a height that meets or exceeds the desired height of the first layer and a planarization operation that trims the height of the depositions to that of the first layer.

In a third embodiment, the selective etching of the third operation of the first embodiment is replaced by a blanket etching operation. The fourth operation is replaced by a selective deposition of sacrificial material to non-structural material regions of the first cross-section. The deposition fills the voids in the unmasked regions and is of sufficient height to reach or exceed the intended height of the first layer. Additionally, the fifth through eighth operations are replaced by a blanket deposition of structural material which fills the voids in the pores of the substrate and extends to a height that meets or exceeds the desired height of the first layer and a planarization operation that trims the height of the depositions to that of the first layer.

Many alternatives to the second and third embodiments also exist, some are analogous to the alternatives noted above for the first embodiment.

In some embodiments, the second and even the third operations may be avoided by careful loading of the substrate with sacrificial and/or structural material. For example, if the voids in the substrate are filled by electroplating, it may be possible to time or otherwise track the progress of the electroplating operations such that the process may be stopped after sufficient filling but prior to complete filling. This approach could achieve the same result as that of complete filling followed by bulk etching.

FIGS. 5(a)-5(i) schematically depicts side views of various states of a process, as applied to the formation of a sample three-layer structure, for preparing a porous substrate for accepting layers of deposited material and then depositing such material according to an embodiment of the invention.

Figure 5A:
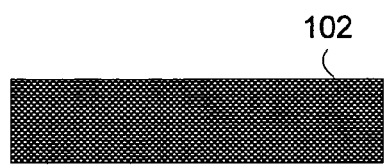
FIGS. 5(a)-5(l) schematically depict side views of various states of the process of an embodiment of an aspect of the invention as applied to the formation of a sample three layer structure.

FIG. 5(a) depicts a substrate 102 where its pores have not yet been filled in with a sacrificial material.

Figure 5B:

FIG. 5(b) depicts a modified substrate 104 whose pores have been filled in with a sacrificial material.

Figure 5C:
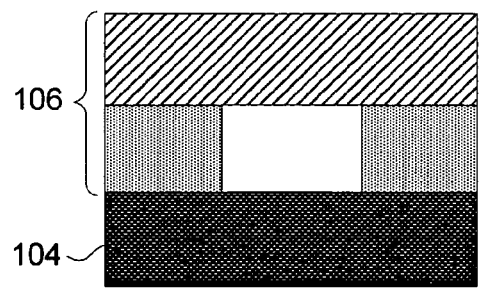

FIG. 5(c) depicts a contact mask 106 which has been pressed against substrate 104 in preparation for selectively etching a portion of the sacrificial material from the pores of the substrate. The patterning of the mask is selected such that it has open areas matching, approximating, or somewhat smaller than the contours of the structural material that is to be deposited in forming the first layer.

Figure 5D:
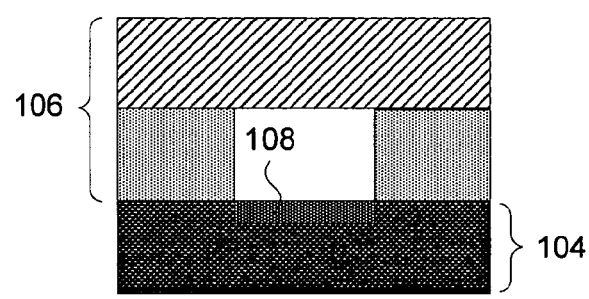

FIG. 5(d) depicts the state of processing after an etching operation using mask 106 has removed sacrificial material from region 108 of substrate 104.

Figure 5E:
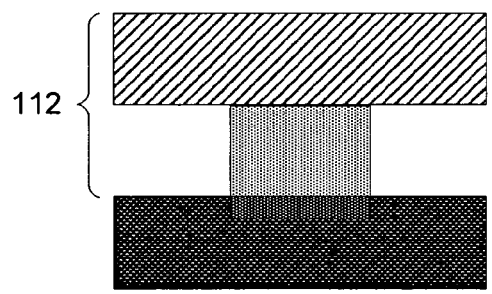

FIG. 5(e) depicts a different contact mask 112 pressed against the surface of substrate 104 in preparation for depositing a sacrificial material onto the surface of substrate 104 to locations where it is intended that sacrificial material exists in association with the first layer. In some embodiments, the patterning of mask 112 may be completely complementary to the patterning of mask 106, in others it could provide shielding of regions that slightly overlap the shielding provided by mask 106, in still others it could provide shielding that is somewhat smaller than the regions unshielded by mask 106.

Figure 5F:
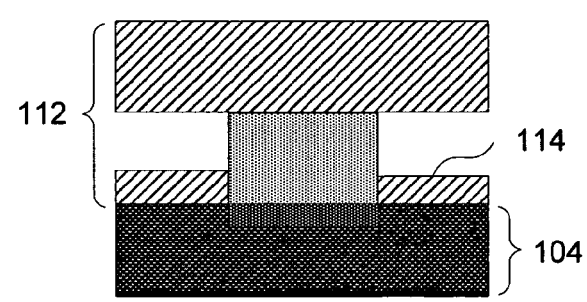

FIG. 5(f) depicts the state of the process after material 114 has been selectively deposited to substrate 104 using mask 112. Depositions on the sides and/or back of the substrate are avoided by the used of appropriate sleeves or other shields that either block current flow to those regions or inhibit any electroplating or other deposition solution from reaching those regions.

Figure 5G:
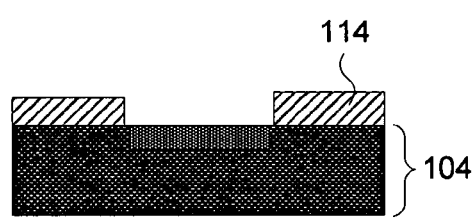

FIG. 5(g) depicts the state of the process after mask 112 has been removed.

Figure 5H:
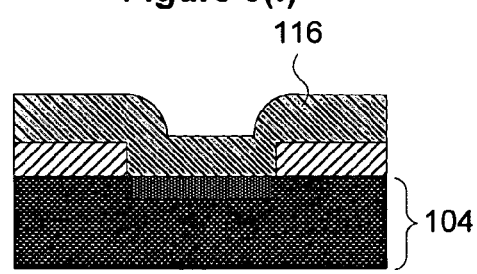
Figure 5I:
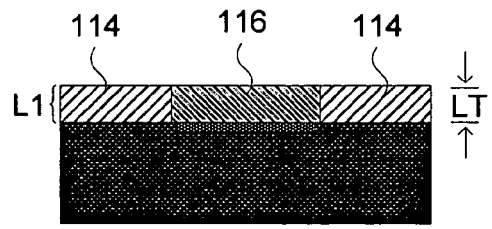

FIG. 5(h) depicts the state of the process after a blanket deposition of a structural material 116 has occurred. FIG. 5(i) depicts the state of the process after the deposits have been planarized to a height, LT, equal to the layer thickness desired for the first layer, L1.

Figure 5J:
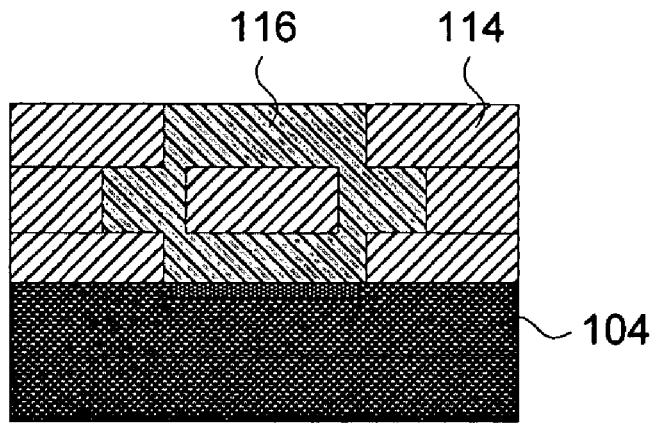

FIG. 5(j) depicts the state of the process after two additional layers have been added.

Figure 5K:
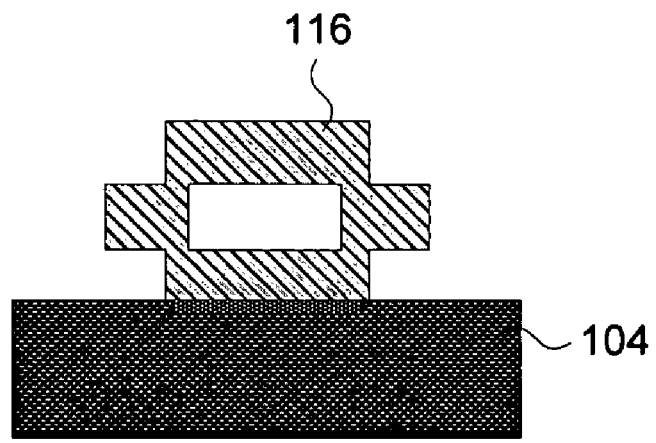
Figure 5L:
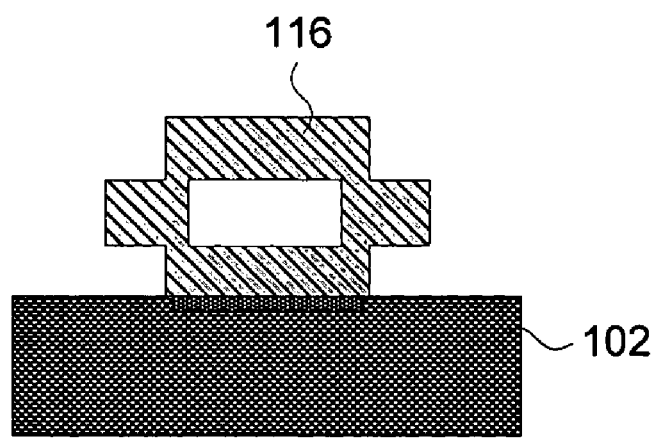

FIG. 5(k) depicts the state of the process after the sacrificial material 114 has been removed. While FIG. 5(l) depicts the state of the process after the sacrificial material filling substrate 104 has been removed, thus bringing the substrate substantially back to its original porous configuration 102 and yielding a structure of desired configuration attached to a non-conducting porous substrate 102.

In other alternative embodiments, an initial deposit of structural material of desired patterning may be obtainable prior to or without filling the entire substrate with sacrificial material. This may be achievable, for example, by placing a dry film photoresist or other patternable material against a surface of the substrate, patterning the material, placing a thin conductive plate or sheet against the patterned material, and thereafter plating structural material onto the plate or sheet to a depth that causes the structural material to grow a desired amount into the pores of the substrate, due to the shielding of the mask, spreading of the structural material will not occur until it begins to penetrate into the pores of the substrate. So if plating time is properly controlled, a bonded pattern of structural material approximating that of the masking pattern may be achieved. After which, the sheet or plate and patterned material may removed by planarization or chemical etching, and then sacrificial material may then be made to fill remaining pores of the substrate. In various other alternative embodiments, prior to the removal of the plate or sheet, the plating bath may be removed, the patterning material may be removed, a new plating bath and anode may be used to plate sacrificial material to a desired depth onto the sheet or plate such that some penetration of the sacrificial material into the pores of the substrate occurs. The plate or sheet can then be removed by a planarization operation leaving behind a layer of structural and sacrificial material which is integrally bonded to the substrate and that contains selected regions of structural material and sacrificial material onto which additional layers of material may be added.

In some embodiments of the invention the removal of sacrificial material surrounding a formed structure may be aided by the presence of the pores in the porous substrate material. This is most particularly the case when the structure is enclosed by a wall and/or lid of structural material or is substantially enclosed by such a wall and lid. In these embodiments any sacrificial material temporarily filling the pores of the porous dielectric material may be removed and then the open pores may allow an etchant to access the sacrificial material used in forming the structure as well as providing an exit path for dissolved sacrificial material to be removed.

FIGS. 6(a)-6(d) schematically depict side views of various states of the process of an embodiment of an aspect of the invention where removal of the sacrificial material used in forming a multi-layer structure occurs at least in part via the pores of a porous substrate.

FIG. 6(a) depicts a structure 116-1 and an enclosing structure 116-2 that have been formed on a porous dielectric substrate 102 that had its pores temporarily filled with a conductive material 106 to produce a modified substrate 104. A conductive sacrificial material 114 that was used during the formation of the structures is shown as being located within openings in structure 116-1 and located between structures 116-1 and 116-2. In some variations of the present embodiment conductive material 106 filling the pores of the substrate may be the same as sacrificial material 114 while in other variations of the present embodiment, the conductive material 106 and the sacrificial material 114 may be different materials.

FIG. 6(a) also shows the existence, in this example, of an opening 118 that extends through structure 116-2 that gives limited access to sacrificial material 114 located within structure 116-2. Depending on the size of opening 118 relative to the volume of material 114 located within the confines of structure 116-2, opening 118 may or may not form an adequate path for the effective release of structures 116-1 and 116-2 from sacrificial material 114. In the present embodiment it is assumed that even though opening 118 provides some access to an etchant, and thus some ability to aid in the release of the structures, the opening 118 is either inadequate to complete the job alone or at least that some additional access to sacrificial material would be useful for releasing the structures.

In the present embodiment after bringing the state of the process to that depicted in FIG. 6(a) two primary operations remain to be performed. A first operation is to remove the conductive material 106 that has temporarily filled the pores of the substrate and simultaneously or thereafter to remove the sacrificial material 114.

FIG. 6(b) shows the state of the process after conductive material 106 has been etched from the pores of substrate 102.

FIG. 6(c) shows the state of the process after a sacrificial material etchant is allowed to attack sacrificial material 114 through opening 118 as well as via the pores in substrate 102.

As can be seen in FIG. 6(c) sacrificial material 114 has been partially removed via the pores of substrate 102 as well as via opening 118.

FIG. 6(d) shows the state of the process after the removal of sacrificial material 114 has been completed.

In variations of the present embodiment, removal of substantially all sacrificial material may occur via the pores in the substrate or alternatively only a small portion of the sacrificial material may be removed via such pores.

In further embodiments of the present invention, after formation of the structure and removal of conductive material from the pores of the substrate, the substrate may be back-filled with a dielectric material to form a solid substrate or at least a substrate that is less permeable to the passage of gases or liquids. In some embodiments of the invention back-filling of the substrate with a suitable fill material may result in the hermetic sealing of an enclosed structure that was formed on the substrate. In other embodiments, it may be possible to back fill region 114 with a dielectric material as well.

Further embodiments for avoiding complete filling of the substrate, for eliminating various operations, or for reordering and changing operations, mutatis mutandis, will be apparent to those of skill in the art upon reviewing the teachings herein.

The techniques disclosed explicitly herein may benefit by combining them with various elements of the dielectric build on and/or incorporation techniques disclosed in the following patent applications (1) U.S. Patent Application No. 60/534,184 filed concurrently herewith by Adam L. Cohen et al and entitled "Electrochemical Fabrication Methods Using Dielectric Substrates and/or Incorporating Dielectric Materials"; (2) U.S. Patent Application No. 60/533,932 filed concurrently herewith by Adam L. Cohen et al. and entitled "Electrochemical Fabrication Methods Using Dielectric Substrates and/or Incorporating Dielectric Materials"; (3) U.S. Patent Application No. 60/534,157, which is entitled "Electrochemical Fabrication Methods Incorporating Dielectric Materials", filed concurrently herewith by Lockard et al; and (4) U.S. patent application Ser. No. 10/841,300 filed concurrently herewith by Lockard et al., and entitled "Methods for Electrochemical Fabricating Structures Using Adhered Masks, Incorporating Dielectric Sheets, and/or Seed Layer That Are Partially Removed Via Planarization". These applications are hereby incorporated herein by reference as if set forth in full.

The patent applications and patents set forth below are hereby incorporated by reference herein as if set forth in full. The teachings in these incorporated applications can be combined with the teachings of the instant application in many ways: For example, enhanced methods of producing structures may be derived from some combinations of teachings, enhanced structures may be obtainable, enhanced apparatus may be derived, and the like.

| U.S. Pat. App. No., Filing Date U.S. App. Pub. No., Pub. Date | Inventor, Title |
|---|---|
| 09/493,496 - Jan. 28, 2000 | Cohen, "Method For Electrochemical Fabrication" |
| 10/271,574 - Oct. 15, 2002 2003-0127336A - Jul. 10, 2003 | Cohen, "Methods of and Apparatus for Making High Aspect Ratio Microelectromechanical Structures" |
| 10/387,958 - Mar. 13, 2003 2003-022168A - Dec. 4, 2003 | Cohen, "Electrochemical Fabrication Method and Application for Producing Three-Dimensional Structures Having Improved Surface Finish" |

-continued

| U.S. Pat. App. No., Filing Date U.S. App. Pub. No., Pub. Date | Inventor, Title |
|---|---|
| 10/434,103 - May 7, 2004 2004-0020782A - Feb. 5, 2004 | Cohen, "Electrochemically Fabricated Hermetically Sealed Microstructures and Methods of and Apparatus for Producing Such Structures" |
| 10/434,289 - May 7, 2003 20040065555A - Apr. 8, 2004 | Zhang, "Conformable Contact Masking Methods and Apparatus Utilizing In Situ Cathodic Activation of a Substrate" |
| 10/434,294 - May 7, 2003 2004-0065550A - Apr. 8, 2004 | Zhang, "Electrochemical Fabrication Methods With Enhanced Post Deposition Processing Enhanced Post Deposition Processing" |
| 10/434,295 - May 7, 2003 2004-0004001A - Jan. 8, 2004 | Cohen, "Method of and Apparatus for Forming Three-Dimensional Structures Integral With Semiconductor Based Circuitry" |
| 10/434,315 - May 7, 2003 2003-0234179A - Dec. 25, 2003 | Bang, "Methods of and Apparatus for Molding Structures Using Sacrificial Metal Patterns" |
| 10/434,494 - May 7, 2003 2004-0000489A - Jan. 1, 2004 | Zhang, "Methods and Apparatus for Monitoring Deposition Quality During Conformable Contact Mask Plating Operations" |
| 10/434,519 - May 7, 2003 2004-0007470A - Jan. 15, 2004 | Smalley, "Methods of and Apparatus for Electrochemically Fabricating Structures Via Interlaced Layers or Via Selective Etching and Filling of Voids" |
| 10/607,931 - Jun, 27, 2003 | Brown, "Miniature RF and Microwave Components and Methods for Fabricating Such Components" |
| 10/677,498 - Oct. 1, 2003 | Cohen, "Multi-cell Masks and Methods and Apparatus for Using Such Masks To Form Three-Dimensional Structures" |
| 10/677,556 - Oct. 1, 2003 | Cohen, "Monolithic Structures Including Alignment and/or Retention Fixtures for Accepting Components" |
| 10/697,597 - Dec. 20, 2002 | Lockard, "EFAB Methods and Apparatus Including Spray Metal or Powder Coating Processes" |
| 10/724,513 - Nov. 26, 2003 | Cohen, "Non-Conformable Masks and Methods and Apparatus for Forming Three-Dimensional Structures" |
| 10/724,515 - Nov. 26, 2003 | Cohen, "Method for Electrochemically Forming Structures Including Non-Parallel Mating of Contact Masks and Substrates" |
| 10/830,262 - Apr. 21, 2004 | Cohen, "Methods of Reducing Interlayer Discontinuities in Electrochemically Fabricated Three-Dimensional Structures" |
| XX/XXX,XXX - May 7, 2004 (Docket P-US093-A-MF) | Cohen, "Electrochemically Fabrication Methods Including Use of Surface Treatments to Reduce Overplating and/or Planarization During Formation of Multi-layer Three-Dimesional Structures" |
| XX/XXX,XXX - May 7, 2004 (Docket P-US104-A-MF) | Thompson, "Electrochemically Fabricated Structures Having Dielectric or Active Bases and Methods of and Apparatus for Producing Such Structures" |
| XX/XXX,XXX - May 7, 2004 (Docket P-US105-A-MF) | Cohen, "Multi-step Release Method for Electrochemically Fabricated Structures" |
| XX/XXX,XXX - May 7, 2004 (Docket P-US098-A-MF) | Cohen, "Methods and Apparatus for Forming Multi-Layer Structures Using Adhered Masks" |

Various other embodiments exist. Some of these embodiments may be based on a combination of the teachings herein with various teachings incorporated herein by reference. Some embodiments may use selective deposition processes and/or blanket deposition processes that are not electrodeposition processes (e.g. sputtering processes, spray metal deposition processes, electroless plating process, and the like). Some embodiments may use one or more structural materials (e.g. nickel, gold, copper, or silver). Still other processes may use other materials whether or not electrodepositable. Some processes may use one or more sacrificial materials (e.g. copper or zinc). Some embodiments may use sacrificial materials in the layer formation process that are dielectric materials. In some embodiments, the porous substrate may not be may not have pores that interconnect with all other pore, in some embodiments the porous material may be a structure fabricated with a recurring pattern of openings or a structure that has a large number of openings made in it by machining, etching or the like. In some embodiments, the porous substrates may be formed by adhering particles together in such a way that gaps between them remain or by forming holes through initially solid blocks of material. In some embodiments, the depth of deposition may be enhanced by moving a conformable contact mask away from the substrate as deposition is occurring in a manner that allows the seal between the conformable portion of the mask and the substrate to shift from the face of the conformal material to the inside edges of the conformable material. In some embodiments, formation of some layers may be incomplete prior to beginning formation of next layers and the completion of the layers may occur in association with the next layers or even in association with layers subsequent to those, whereby layers have structures interlaced with those of other layers.

In view of the teachings herein, many further embodiments, alternatives in design and uses are possible and will be apparent to those of skill in the art. As such, it is not intended that the invention be limited to the particular illustrative embodiments, alternatives, and uses described above but instead that it be solely limited by the claims presented hereafter.

We claim:

1. A fabrication process for forming a multi-layer three-dimensional structure, comprising:
   (a) supplying a substrate which comprises a porous dielectric having connected regions of dielectric material with spaces located between the regions and having a first sacrificial material located within at least some of the spaces;
   (b) forming a first layer comprising a pattern of at least one structural material which contacts only a portion of the dielectric regions and occupies at least a portion of the openings between some of the dielectric regions and further comprises at least one sacrificial build material;
   (c) forming each of a plurality of layers of patterned material on a previously formed layer, wherein each layer comprises at least one structural material and at least one sacrificial build material; and
   (d) after formation of the plurality of layers, removing at least part of the first sacrificial material from the spaces and at least a portion of the at least one sacrificial build material from the plurality of layers.

2. The process of claim 1 wherein at least one of the forming of the first layer or the forming of the plurality of layers comprises an electrodeposition of at least one material.

3. The process of claim 1 wherein at least one of the forming of the first layer or the forming of the plurality of layers comprises an electroless deposition of at least one material.

4. The process of claim 1 wherein at least one of the structural material or the sacrificial build material of the layer or of the plurality of layers is patterned using a contact mask.

5. The process of claim 4 wherein the patterning comprises a selective deposition operation.

6. The process of claim 4 wherein the patterning comprises a selective etching operation.

7. The process of claim 1 wherein at least one structural material or the at least one sacrificial build material is patterned using an adhered mask.

8. The process of claim 1 wherein at least at portion of the at least one sacrificial build material is removed after formation of the plurality of layers, at least in part, via pathways extending through the spaces in the dielectric substrate.

9. The process of claim 8 wherein the removal of at least about 50% of sacrificial build material occurs via pathways extending through the spaces in the dielectric substrate.

10. The process of claim 1 wherein after removing at least part of the first sacrificial material, a flowable dielectric material is made to fill at least a portion of the spaces in the dielectric substrate.

11. The process of claim 1 wherein the formation of at least a given layer of the plurality of layers comprises:
    (a) selectively depositing at least one first material;
    (b) blanket depositing at least one second material; and
    (c) planarizing both of the first and second materials to trim a height of the given layer to a desired layer thickness, wherein one of the at least first material or the second material comprises the structural material and wherein the other of the at least one first material or the second material comprises the sacrificial material.

12. The process of claim 1 wherein the forming of the pattern comprises, selectively etching a pattern into the first sacrificial material to cause at least one void therein and thereafter depositing the at least one structural material into the at least one void.

13. The process of claim 1 wherein the forming of the pattern comprises, selectively etching a pattern into the first sacrificial material to cause at least one void therein and thereafter depositing at least a second sacrificial material above the first sacrificial material at least in some regions that are separate from the at least one void and thereafter depositing at least one structural material into the at least one void.

14. The process of claim 13 wherein the first sacrificial material and second sacrificial materials are the same material.

15. The process of claim 1 wherein the forming of the pattern comprises, bulk etching the first sacrificial material to expose at least some spaces between the regions of dielectric material, thereafter selectively depositing at least a second sacrificial material above the first sacrificial material leaving at least one region free of exposed spaces, and thereafter depositing at least one structural material into the at least one region of exposed spaces.

16. The process of claim 15 wherein the first sacrificial material and second sacrificial materials are the same material.

17. A fabrication process for forming a multi-layer three-dimensional structure, comprising:
    (a) supplying a substrate comprising a porous dielectric having connected regions of dielectric material with spaces located between the regions and having a first sacrificial material located within at least some of the spaces;
    (b) depositing a first layer comprising at least one structural material and at least one sacrificial material wherein a pattern of the at least one structural material which contacts only a portion of the dielectric regions on a surface of the substrate and occupies at least a portion of the openings between some of the dielectric regions; and
    (c) forming a plurality of layers of patterned material on the substrate, wherein each layer comprises at least one structural material and at least one sacrificial material;
    (d) removing at least a portion of the sacrificial material from a plurality of layers after formation of the plurality of layers and removing at least part of the first sacrificial material from the spaces.

18. The process of claim 17 wherein the depositing of the at least one structural material occurs via an electrodeposition process.

19. The process of claim 17 wherein the depositing of the at least one structural material occurs via an electroless deposition process.

20. A fabrication process for forming a multi-layer three-dimensional structure, comprising:
    (a) supplying a substrate comprising a porous dielectric having connected regions of dielectric material with spaces located between the regions and having a first sacrificial material located within at least some of the spaces;
    (b) forming a first layer comprising depositing a pattern of at least one structural material and at least one sacrificial material which each contacts the dielectric regions;
    (c) forming a plurality of layers of patterned material on the substrate, wherein each layer comprises at least one structural material and at least one sacrificial material; and
    (d) removing at least a portion of the sacrificial material from a plurality of layers after formation of the plurality of layers and removing at least part of the first sacrificial material from the spaces.

21. The process of claim 20 wherein the depositing of the at least one structural material occurs via an electrodeposition process.

22. The process of claim 20 wherein the depositing of the at least one structural material occurs via an electrodeposition process.

* * * * *